(12) United States Patent
Cremelie

(10) Patent No.: US 9,792,316 B1
(45) Date of Patent: Oct. 17, 2017

(54) SYSTEM AND METHOD FOR EFFICIENT DATA REMOVAL IN A DEDUPLICATED STORAGE SYSTEM

(75) Inventor: Nick Cremelie, Ghent (BE)

(73) Assignee: Veritas Technologies LLC, Mountain View, CA (US)

( * ) Notice: Subject to any disclaimer, the term of this patent is extended or adjusted under 35 U.S.C. 154(b) by 601 days.

(21) Appl. No.: 12/899,339

(22) Filed: Oct. 6, 2010

Related U.S. Application Data

(60) Provisional application No. 61/249,541, filed on Oct. 7, 2009.

(51) Int. Cl.
*G06F 17/30* (2006.01)

(52) U.S. Cl.
CPC .............. *G06F 17/30371* (2013.01)

(58) Field of Classification Search
CPC ................ G06F 17/30; G06F 17/30156
USPC ....... 707/692, 640, 674, 679, 687, 736, 661, 707/698, 749, 758, 770
See application file for complete search history.

(56) References Cited

U.S. PATENT DOCUMENTS

| | | | |
|---|---|---|---|
| 7,047,212 B1 * | 5/2006 | Pych et al. ................ | 705/27.1 |
| 7,546,319 B1 | 6/2009 | Srinivasan et al. | |
| 7,567,188 B1 | 7/2009 | Anglin et al. | |
| 2005/0240628 A1 | 10/2005 | Jiang et al. | |
| 2007/0067332 A1 | 3/2007 | Gallagher et al. | |
| 2007/0198659 A1 | 8/2007 | Lam | |
| 2007/0288494 A1 | 12/2007 | Chrin et al. | |
| 2008/0243878 A1 | 10/2008 | De Spiegeleer et al. | |
| 2009/0013129 A1 * | 1/2009 | Bondurant ............ | G06F 3/0608 711/115 |
| 2009/0171888 A1 | 7/2009 | Anglin | |
| 2009/0204636 A1 * | 8/2009 | Li et al. .................... | 707/103 Y |
| 2009/0204650 A1 | 8/2009 | Wong et al. | |
| 2009/0319534 A1 * | 12/2009 | Gokhale .................. | 707/10 |
| 2010/0082700 A1 | 4/2010 | Parab | |
| 2010/0131480 A1 | 5/2010 | Schneider | |
| 2010/0306175 A1 * | 12/2010 | Johnson et al. ............. | 707/663 |

OTHER PUBLICATIONS

A Data Cleansing Software Suite for Business and IT users, Data Ladder—Get the most out of your data, 2014, https://www.oasis-open.org/committees/tc_home.php?wg_abbrev=dcml-frame#feedback, 1 page. [Retrieved Nov. 12, 2014].
International Search Report in application No. GB0805503.0 dated Jul. 24, 2008.
"Veritas NetBackup PureDisk Remote Office Edition Administrator's Guide", Copyright 2006, by Symantec Corporation.

(Continued)

*Primary Examiner* — Fred I Ehichioya
*Assistant Examiner* — Johnese Johnson
(74) *Attorney, Agent, or Firm* — Meyertons, Hood, Kivlin, Kowert & Goetzel, P.C.

(57) ABSTRACT

A system, method, and medium for detecting expired data in a data deduplicated storage system are disclosed. The system receives a request to insert a file into the deduplicated storage system. In response, the system determines a unique identifier for the file and stores the unique identifier in a list of unique identifiers associated with a data object that stores the file content. The system determines that the data object is not expired based at least in part on the identifier being present in the list of unique identifiers.

19 Claims, 6 Drawing Sheets

(56) References Cited

OTHER PUBLICATIONS

"NetBackup 6.0 PureDisk Remote Office Edition", by Unknown on Apr. 5, 2006, Symantec Corporation.
De Wispelaere, Wim, "Secure Optimized Data Protection for Remote Offices: An Overview of Veritas NetBackup PureDisk Remote Office Edition", Mar. 7, 2006, Symantec Corporation.
"A Data Cleansing Software Suite for Business and IT users", Data Ladder—Get the most out of your data, 2014, www.dataladder.com, 1 page. [Retrieved Nov. 12, 2014].
"Midrange & Mainframe Systems", Data Domain, May 25, 2010, http://web.archive.org/web/20100525234619/http://www.datadomain.com/solutions/mainframe.html, 1 page. [Retrieved Apr. 24, 2015].
"An EMC Perspective on Data De-Duplication for Backup", EMC Perspective, Jun. 2008, http://web.archive.org/web/20090320022757/http://www.emc.com/collateral/emc-perspective/h4413-data-dedup.pdf, 11 pages. [Retrieved Apr. 24, 2015].
"Dedupe media going offline", Symantec Corporation, Jan. 12, 2010, http://aka-community.symantec.com/connect/pt-br/forums/dedupe-media-going-offline, 3 pages. [Retrieved Apr. 24, 2015].
Gralla, Preston, "Audio Dedupe Cleans up Your Music Collection", PCWorld, Feb. 27, 2010, http://web.archive.org/web/20110114085518/http://www.pcworld.com/article/188401/audio_dedupe_cleans_up_your_music_collection.html?tk=mod_rel, 4 pages. [Retrieved Apr. 24, 2015].

\* cited by examiner

SYSTEM AND METHOD FOR EFFICIENT DATA REMOVAL IN A DEDUPLICATED STORAGE SYSTEM

This application claims benefit of priority to U.S. Provisional Patent Application No. 61/249,541, filed Oct. 7, 2009. The preceding provisional application is incorporated herein by reference in its entirety. To the extent that material in the Provisional Application conflicts with material expressly set forth herein, the material expressly set forth herein controls.

BACKGROUND

Some storage systems, such as backup or shared storage service systems, may store large amounts of data from many different computers. For example, a backup storage system may regularly receive data from many different end-point computer systems (e.g., desktops in an organization) and store backup copies of that data in a data store. Each source computer may insert files (or file segments) into the storage system by request and later remove any of the files or segments by subsequent request. As used herein, the term file may refer to files, file segments, or any other data that a source computer system may insert into a storage system.

Files normally include respective file attributes (e.g., filename, path, size, owner, modification/access history, permissions, etc.) and file content (i.e., file data). While each file may have unique file attributes that uniquely identify that file, multiple files inserted into a storage system may have the same content portion (or overlapping content portions). Storing multiple files with the same file content is redundant and is an inefficient use of limited storage resources.

To reduce the amount of storage space required when storing multiple files with the same or overlapping content, a storage system may be configured to employ data deduplication techniques. When multiple files with the same content are inserted into a deduplicated storage system (DSS), the DSS may store one or more file attributes for each file but only a single copy of the file content that is common to the multiple files. The single data object of the file content stored by the DSS may be referred to herein as a data object. The DSS may maintain metadata indicating that the multiple files each correspond to the same stored data object.

When a source computer requests that a given file be removed from the DSS, the DSS may update the metadata to remove the relationship between the source computer and the stored data object. When the metadata indicates that no source computer has a relationship to the stored data object (i.e., every source computer that has requested the file be inserted has subsequently requested the file be removed) the stored data object becomes expired (i.e., no longer needed by any source computer) and the DSS may delete the expired data object from the storage data store.

A DSS therefore requires an efficient and correct method for detecting expired data objects. Traditional techniques for detecting expired data objects often involve mark-and-sweep techniques. In a mark phase, the traditional DSS traverses the metadata records and for each inserted file, finds and marks the corresponding stored data object. In a subsequent sweep phase, the DSS traverses the stored data objects and deletes each one that is not marked. However, mark-and-sweep techniques are time consuming and result in expired data objects remaining in the data store for considerable periods between sweeps.

SUMMARY OF EMBODIMENTS

A system, method, and medium for detecting expired data in a deduplicated storage system (DSS) are disclosed. The system receives a request to insert a file into the DSS. In response, the system determines a unique identifier for the file and stores the unique identifier in a list of unique identifiers. The list is associated with a data object in the DSS that stores the file content. The system determines that the data object is not expired, based at least in part, on the unique identifier being present in the list.

In some embodiments, the list of unique identifiers lists the respective identifiers of files inserted into the deduplicated storage system that contain the file content. The list may be associated with the data object using a fingerprint of the file content, such as one calculated by applying one or more hash functions to the file content.

In some embodiments, if the system subsequently receives a request to remove the file from the deduplicated storage system, the system may respond by removing the unique identifier from the list. If the list does not contain any unique identifiers, the system may determine that the data object associated with the list is expired and delete the expired data object. In some embodiments, the system may determine that the data object is expired and delete the expired data object automatically in response to receiving the request to remove the file.

In some embodiments, the request to insert the file may be received from a source computer as part of a data backup process. The file may correspond to a segment of a larger file.

In some embodiments, the unique identifier may distinguish the file from among a multiple files inserted into the deduplicated storage system from multiple source computes. Each unique identifier may include one or more sub-identifiers that indicate provenance data for the respective file. In some embodiments, the system may filter the unique identifiers according to their respective parts.

DETAILED DESCRIPTION

Figure 1:
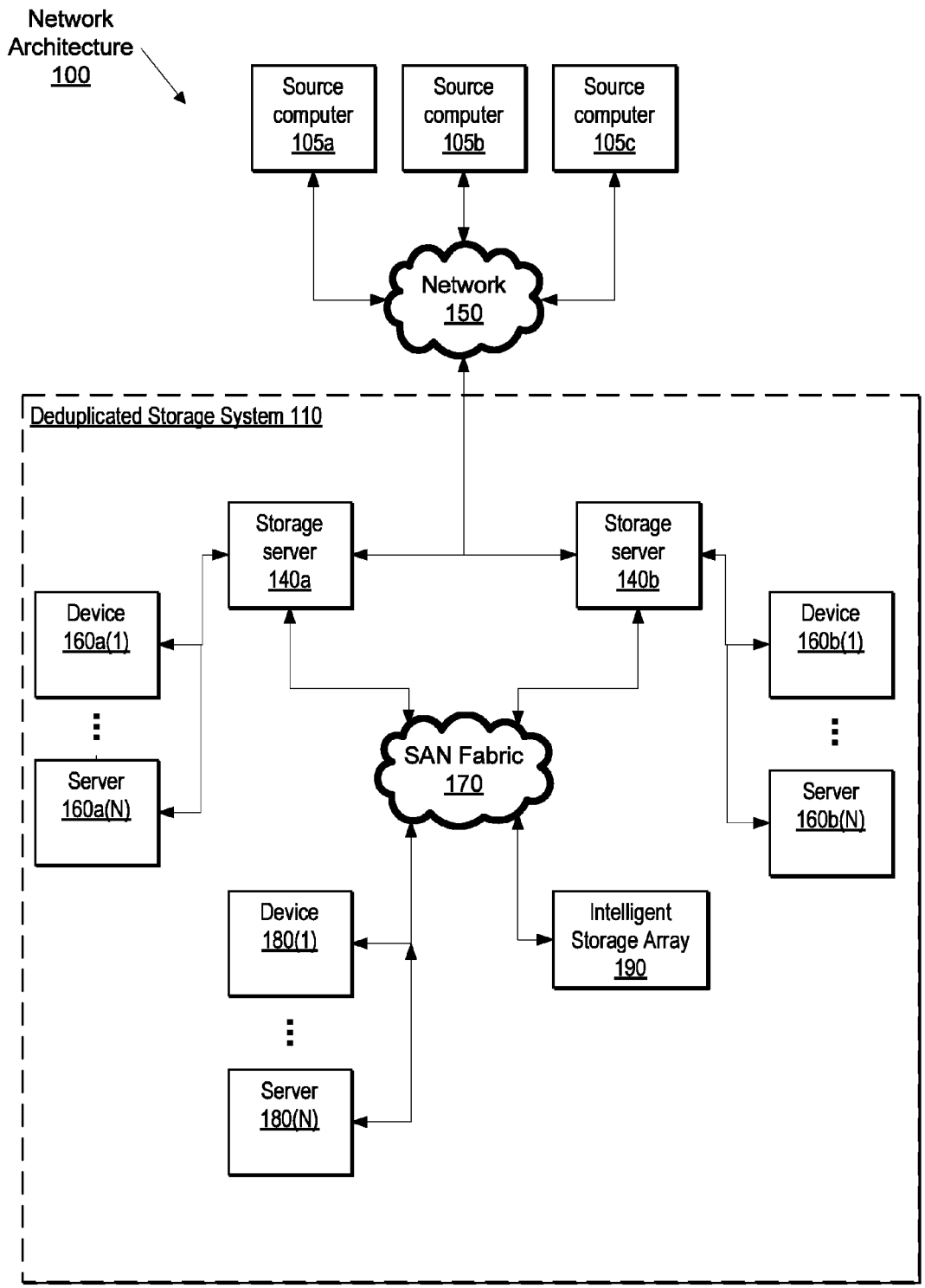
FIG. 1 is a block diagram illustrating the components of a network architecture configured to implement a deduplicated storage system (DSS), according to some embodiments.

FIG. 1 is a block diagram illustrating the components of a network architecture configured to implement a deduplicated storage system (DSS), according to some embodiments. Network architecture 100 illustrates multiple source computers 105a-105c connected via network 150 to deduplicated storage system 110.

In the illustrated embodiment, source computers 105 are configured to communicate with DSS 110 via storage servers 140a and 140b. Storage servers 140 and/or various other storage components of DSS 110 may be used to implement a storage data store for storing data objects of inserted files. In some embodiments, source computers 105 may be configured to communicated with DDS 110 via fewer, additional, or other servers, such as a proxy server.

In the illustrated embodiment, storage server 140a is further depicted as having storage devices 160a(1)-(N) directly attached, and storage server 140b is depicted with storage devices 160b(1)-(N) directly attached. Storage servers 140 are also connected to a SAN fabric 170, although connection to a storage area network is not required in all embodiments. In some embodiments, various other types of networks, such as Ethernet networks may be used in place of SAN fabric 170. In one embodiment, SAN fabric 170 supports access to storage devices 180(1)-(N) by storage servers 140a and 140b, and by source computers 105a-105c via network 150. Intelligent storage array 190 is also shown as an example of a specific storage device accessible via SAN fabric 170. In various embodiments, network architecture 100 may be implemented as part of a cloud computing platform.

As described above, DSS 110 may include a data store for storing single instance data objects of inserted files. This data store may be implemented by any combination of storage devices, including devices 160, 180, and/or 190. In various embodiments, the DSS and/or network architecture may include various other components, such as described in co-pending application Ser. No. 11/731,572, which is incorporated herein by reference.

Figure 2:
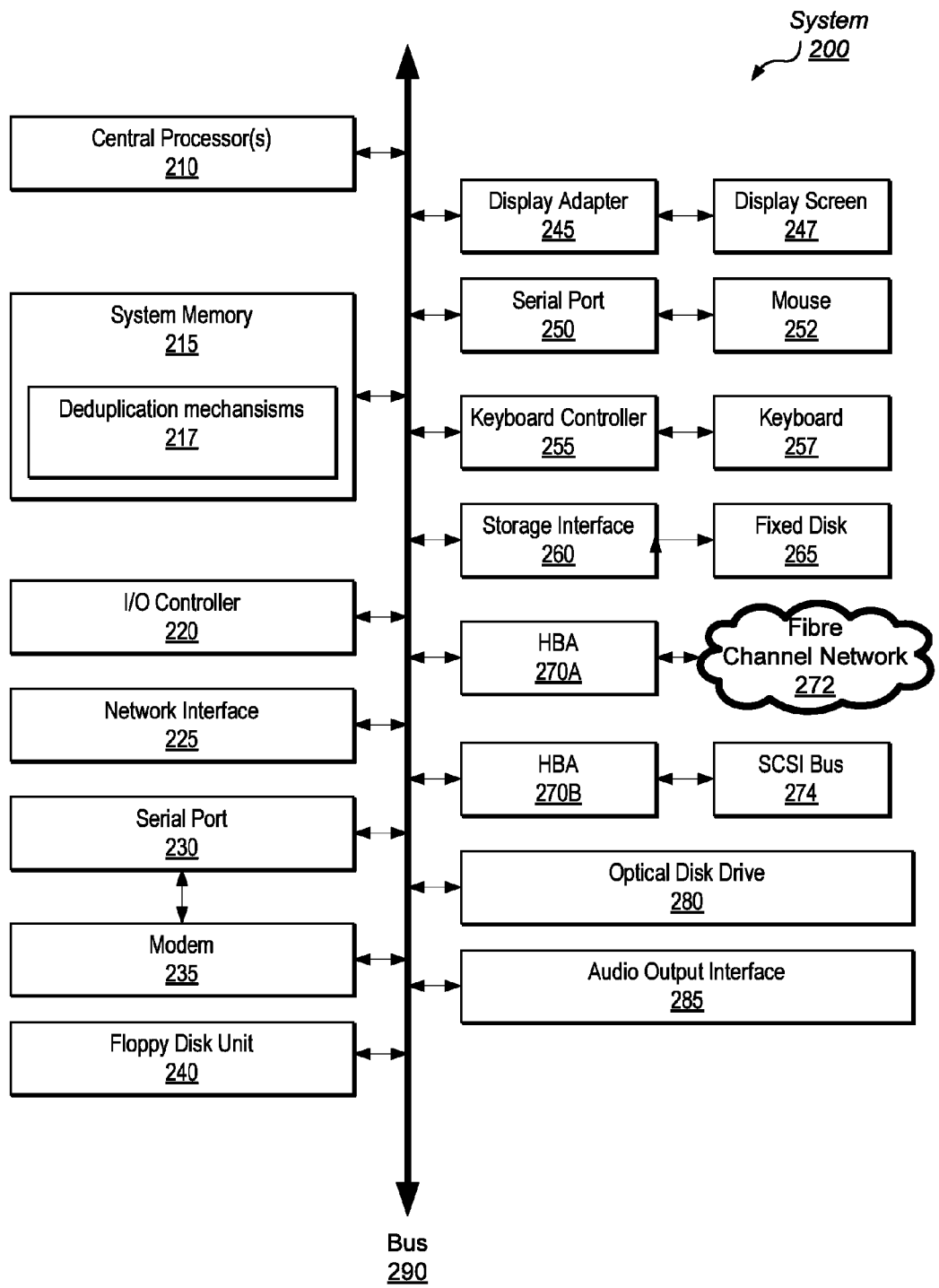
FIG. 2 depicts a block diagram of a computer system suitable for implementing a client or server computer in a deduplicated storage system and configured to detect and remove expired data objects efficiently, according to some embodiments.

FIG. 2 depicts a block diagram of a computer system 200 suitable for implementing a client or server computer in a deduplicated storage system (e.g., source computers 105 and storage servers 140 in DSS 110 of FIG. 1), configured to detect and remove expired data objects efficiently, according to some embodiments. Computer system 200 includes a bus 290 which interconnects major subsystems of computer system 200, such as a central processor 210, a system memory 215 (typically RAM, but which may also include ROM, flash RAM, or the like), an input/output controller 220, an external audio device, such as a speaker system via an audio output interface 285, an external device, such as a display screen 247 via display adapter 245, serial ports 230 and 250, a keyboard 257 (interfaced with a keyboard controller 255), a storage interface 260, a floppy disk drive 240 operative to receive a floppy disk, a host bus adapter (HBA) interface card 270A operative to connect with a Fibre Channel network 272, a host bus adapter (HBA) interface card 270B operative to connect to a SCSI bus 274, and an optical disk drive 280 operative to receive an optical disk. The illustrated embodiment may also include a mouse 252 (or other point-and-click device, coupled to bus 290 via serial port 250), a modem 235 (coupled to bus 290 via serial port 230), and a network interface 225 (coupled directly to bus 290).

In some embodiments, bus 290 may allow data communication between central processor 210 and system memory 215, which may include read-only memory (ROM) or flash memory (neither shown), and random access memory (RAM) (not shown), as previously noted. The RAM may be the main memory into which the operating system and application programs are loaded. The ROM or flash memory can contain, among other code, the Basic Input-Output system (BIOS), which controls basic hardware operation such as the interaction with peripheral components. Applications and/or data resident with computer system 200 are generally stored on and accessed via a computer readable medium, such as a hard disk drive (e.g., fixed disk 265), an optical drive (e.g., optical drive 280), a floppy disk unit 240, or other storage medium. For example, various ones of these storage facilities may be used to store data objects in a DSS data store. In some embodiments, applications can be in the form of electronic signals modulated in accordance with the application and data communication technology when accessed via network modem 235 or interface 225.

Storage interface 260, as with the other storage interfaces of computer system 200, can connect to a standard computer readable medium for storage and/or retrieval of information, such as a fixed disk drive 265. Fixed disk drive 265 may be a part of computer system 200 or may be separate and accessed through other interface systems. Modem 235 may provide a direct connection to a remote server via a telephone link or to the Internet via an internet service provider (ISP). Network interface 260 may provide a direct connection to a remote server via a direct network link to the Internet via a POP (point of presence). Network interface 225 may provide such connection using wireless techniques, including digital cellular telephone connection, Cellular Digital Packet Data (CDPD) connection, digital satellite data connection or the like.

Various other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application.

Code to implement various aspects of the present disclosure can be stored in computer-readable storage media such as one or more of system memory 215, fixed disk 265, optical disk 280, or floppy disk read by floppy disk unit 240. For example, system memory 215 may include deduplication mechanisms 217. On source computers, deduplication mechanisms 217 may include facilities for interfacing with a DSS, such as backup software and/or other software mechanisms for requesting that given files be inserted or removed from the DSS. On a computer within the DSS itself, deduplication mechanisms 217 may include software for detecting requests to insert duplicate data, for marking the data as described herein, and for detecting whether a given data object is expired (e.g., in response to receiving a remove request corresponding to the data object). In various embodiments, the operating system provided on computer system 200 may be any of various operating systems, including MS-DOS®, MS-WINDOWS®, OS/2®, UNIX®, Linux®, or another known operating system.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
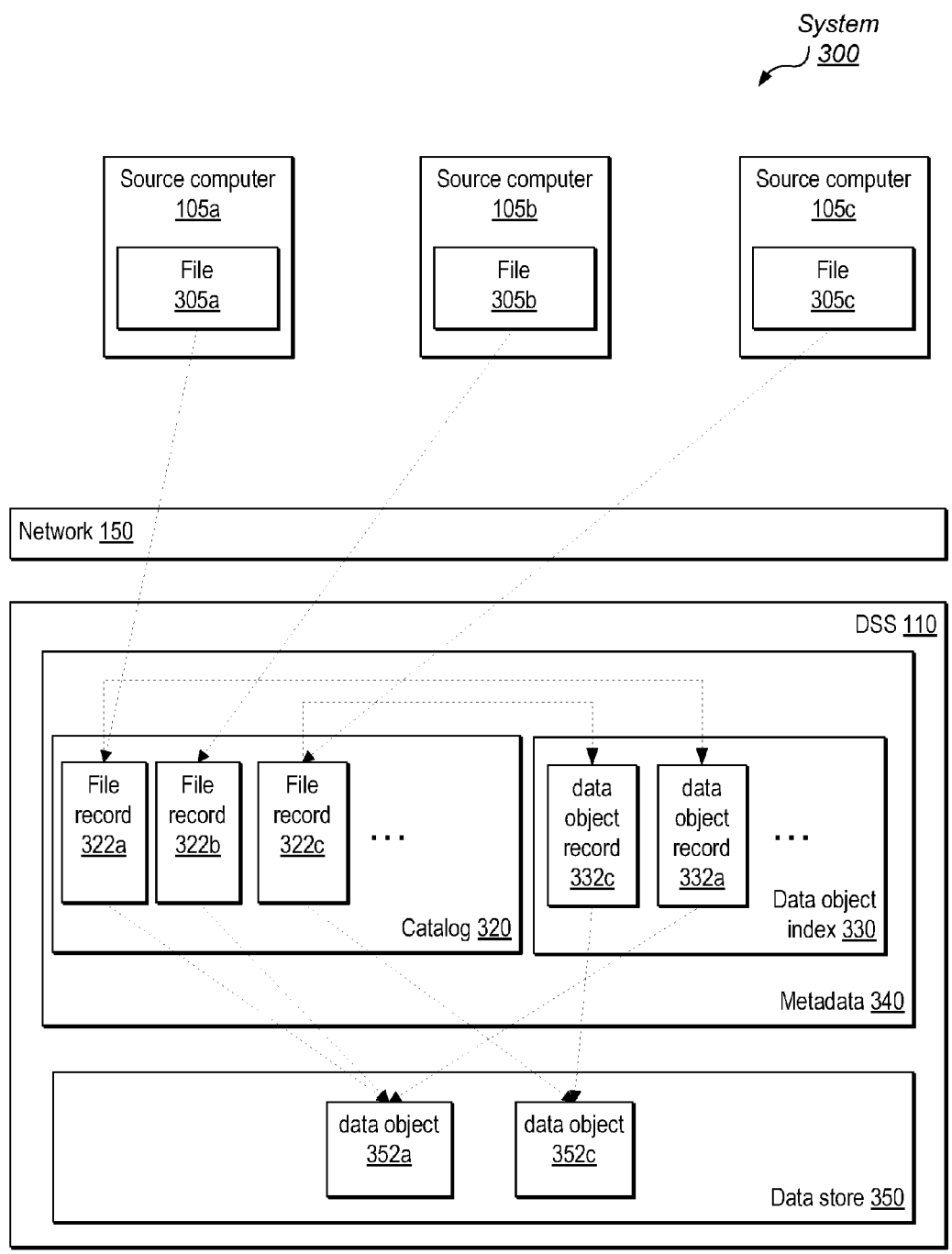
FIG. 3 is a block diagram illustrating the components of a DSS architecture configured to detect and delete expired data objects, according to some embodiments.

FIG. 3 is a block diagram illustrating the components of a DSS architecture configured to detect and delete expired data objects, according to some embodiments. FIG. 3 also illustrates sample data within the DSS and interrelations between that data. In some embodiments, system 300 of FIG. 3 may correspond to network architecture 100 of FIG. 1. For continuity, analogous components are labeled identically. However, in various embodiments, system 300 and network architecture 100 may represent separate systems, such that hardware implementing DSS 110 of FIG. 3 need not always correspond exactly to the analogously named component in FIG. 1.

As in FIG. 1, system 300 includes three source computers 105a-105c, each in communication with DSS 110 over network 150. In the illustrated embodiment, each of source computers 105a-105c stores a respective one of files 305a-305c. Each of files 305 includes respective file attributes (e.g., filename, path, size, owner, modification/access history, permissions, etc.) and file content (i.e., file data). In some embodiments, each file 305 may be stored in a file system hosted by the respective source computer 105. Such file systems may be dedicated or shared.

In the illustrated embodiment, each of computers 105 has made a respective request to insert its file into DSS 110. That is, source computer 105a has requested to insert file 305a, source computer 105b to insert file 305b, and source computer 305c to insert file 305c. In some embodiments, any of computers 105 may make such insert requests over network 150 as part a networked backup/archival process.

In response to receiving a request to insert a given file from a source computer, the DSS may create and/or update a metadata file record corresponding to the given file. For example, in the illustrated embodiment, DSS 110 has created file records 322a-322c in metadata catalog 320 to track inserted files 305a-305c respectively.

Figure 4A:
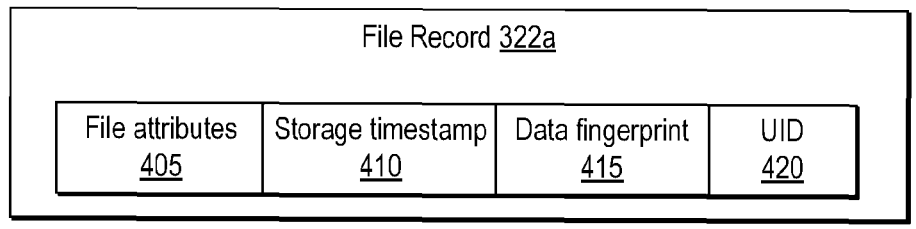
FIG. 4a illustrates the components of a file record according to some embodiments.

FIG. 4a illustrates the components of a file record according to some embodiments. According to the illustrated embodiment, file record 322a may include file attributes 405, storage timestamp 410, data fingerprint 415, and unique identifier 420, as described below. In various embodiments, a file record may include fewer and/or additional components.

In some embodiments, file attributes 405 may include any number of attributes of the corresponding file (e.g., filename, path, size, owner, modification/access history, permissions, etc. of file 305a). Storage timestamp 410 may include an indication of when the file record was created or last updated.

Data fingerprint 415 may contain a small fingerprint that effectively uniquely identifies the data in the corresponding file, such that two files with the same data portion will have the same data fingerprint and two files with different data portions will have different fingerprints. For example, the data fingerprint may be derived by applying one or more hash functions to the data portion of the corresponding file (e.g., MD5 hash). Various other methods for calculating data fingerprints are known in the art and may be used to calculate data fingerprints, such as 415.

According to the illustrated embodiment, file record 322a also include unique identifier 420 for the corresponding file. UID 420 may uniquely identify file 305a using various techniques. For example, FIG. 4c illustrates an example of a UID according to some embodiments.

Returning now to FIG. 3, catalog 320 (and/or any of metadata 340) may be stored in one or more managed database systems, such as one or more relational, hierarchical, object-oriented, and/or other types of database systems. The arrows from files 305 to file records 322 indicate the correspondences between files and the respective file records created in response to inserting each file.

In some circumstance, two or more files on one or more source computers may contain the same file data part, even if those files have different file attributes. For example, two files with two different names on two different computers may still store identical file data. If such multiple files are inserted into a DSS, the DSS may be configured to store a separate file record for each of the files, but to store only a single data object of the shared file data. For example, in FIG. 3, each of files 305a and 305b contains the same file data. Therefore, even though each file corresponds to a unique file record (as indicated by the arrows from 305a and 305b to 322a and 322b respectively), both of the file records correspond to the same single instance data object of the file data (as indicated by the arrows from 322a and 322b to data object 352a in data store 350).

Data store 350 may be implemented by various disc drives, optical drives, solid-state memory and/or other storage devices in various configurations, as discussed with respect to FIG. 1. In some embodiments, data objects in data store 350 may be managed as files using one or more file systems. In various embodiments, the file system and/or any other software or hardware storage resource used in implementing data store 350 may be used to store any or all of metadata 340, including catalog 320 and/or data object index 330.

In some embodiments, multiple data objects may be stored together within a data object container within data store 350. FIG. 4d illustrates the components of a data object container, according to some embodiments. In the illustrated example, container 460 includes data objects 352a-352n and a data object index 465 that identifies where each data object is stored within the container. For example, data object index 465 may correlate a respective data fingerprint for each data object in the container with a start and end location for that data object within the container.

Returning to FIG. 3, DSS metadata (e.g., 340) may include a data object index (e.g., 330) for recording metadata about various data objects in the data store. For example, data object index 330 includes a respective data object record (332a and 332c) for each of data objects 352a and 352c in data store 350. Each data object record may store information regarding the corresponding data object and the data object records may be indexed by the fingerprints of the corresponding data objects.

Data object index 330 may be implemented as a managed database (e.g., relational database) or unmanaged database (e.g., a collection of files). In some embodiments, data object index 330 may be implemented by a database separate from that implementing catalog 320.

Figure 4B:
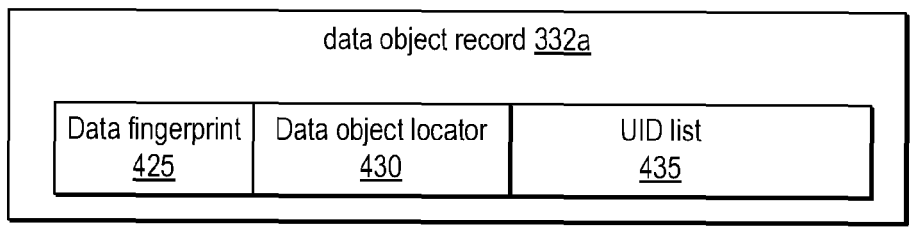
FIG. 4b is a block diagram illustrating components of a data object record according to some embodiments.
Figure 4C:
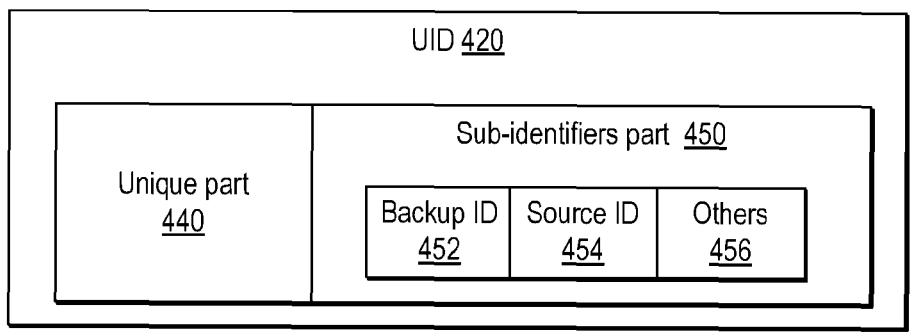
FIG. 4c is a block diagram illustrating the components of a unique file identifier, according to some embodiments.
Figure 4D:
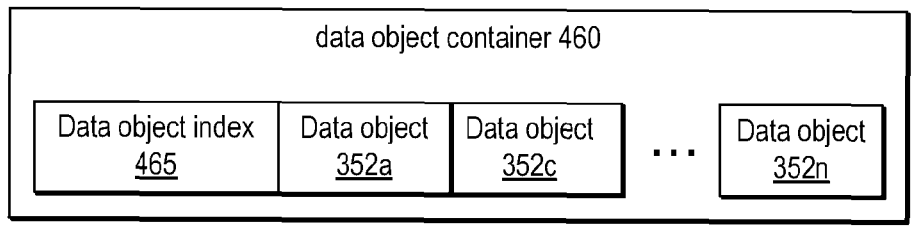
FIG. 4d illustrates the components of a data object container, according to some embodiments.

FIG. 4b is a block diagram illustrating components of a data object record according to some embodiments. In the illustrated embodiment, data object record 332a includes a data fingerprint 425 for the corresponding data object and a data object locator component 430 usable to locate the data object within the data store (e.g., path information).

In some embodiments, each data object record may include a UID list, such as 435, which may list one or more UIDs of file records in catalog 320. When a source computer (e.g., 105a) makes a request to insert a file (e.g., 305a), the DSS creates a file record (e.g., 322a) with a UID (e.g., 420) for the file and fingerprint (e.g., 415) for the data of the file. In such embodiments, the DSS may then insert that UID into the data object record that has the same data fingerprint (i.e., the fingerprint of the data object holding the file data of the inserted file). When the DSS removes a file record (e.g., in response to a request from a source computer), the DSS also removes the UID of that file record from the corresponding data object record. Thus, in such embodiments, the UID list of a data object record (e.g., 435 of data object record 332a) uniquely identifies each file in the DSS whose file data corresponds to that data object.

In some embodiments, the data object index may organize (i.e., index) the data object records by fingerprint for quick retrieval. In various embodiments, data object index 330 may be stored in a relational database, in separate files in the data store, or in another type of database.

FIG. 4c is a block diagram illustrating the components of a unique file identifier, according to some embodiments. UID 420 of FIG. 4c may correspond to UID 420 of FIG. 4a and may be listed in a UID list of a data object record, such as UID list 435 of FIG. 4b.

As described above, a UID may be used to uniquely identify a file that has been inserted into the DSS. In some embodiments, the UID may comprise a unique part, such as 440. A unique part may be used to ensure uniqueness for the UID among other UIDs. For example, the unique part may be generated using various random and/or pseudo-random number generation techniques, hash functions of various file attributes, a global counter, deliberate allocation of unique identifiers, and/or any other technique that effectively ensures the uniqueness of the unique part.

In some embodiments, a UID may also comprise a sub-identifiers part, such as 450. A sub-identifier, such as 450, may include any number of sub-identifiers for the file that describe the file or its origins (i.e., provenance metadata). For example, in the illustrated embodiment, the sub-identifiers of 450 include backup ID 452, source ID 454, and other classifiers 456. In this example, backup ID 452 may uniquely identify a backup process that inserted the corresponding file into the DSS. The source ID 454 may identify the source computer that inserted the file into the DSS. In this example, both backup ID 452 and source ID 454 may be considered provenance data since both describe the origins of the file.

In some embodiments, the DSS may use UID sub-identifiers (e.g., 452-456) to facilitate filtering functions. For example, the system may use the sub-identifiers to quickly filter a set of UIDs to identify those that originated from the same backup and/or from the same source computer, etc. The DSS may thus expedite some common operations, such as removing all files inserted by a given client or restoring all data that was inserted by a given backup process and/or at a given date. Additionally, if deduplicated data is replicated onto various other storage systems, the other storage systems may rely on the sub-identifiers to determine the origins of the data.

In some embodiments, metadata that is often used for filtering may be stored in the sub-identifiers while data not used for filtering may be stored in the catalog 320, such as by using separate metadata records. In some embodiments, the information stored in the UID sub-identifiers may be redundant with some or all of that stored in the catalog, thereby allowing the DSS to recover metadata if the catalog becomes lost, corrupted, or otherwise unavailable. For example, if catalog 320 is implemented using a managed (e.g., relational) database, but data object index 330 is implemented as a separate unmanaged database (e.g., files within the file system), then the UIDs in the data object records may be used to recover some metadata should the catalog become corrupted.

Figure 5:
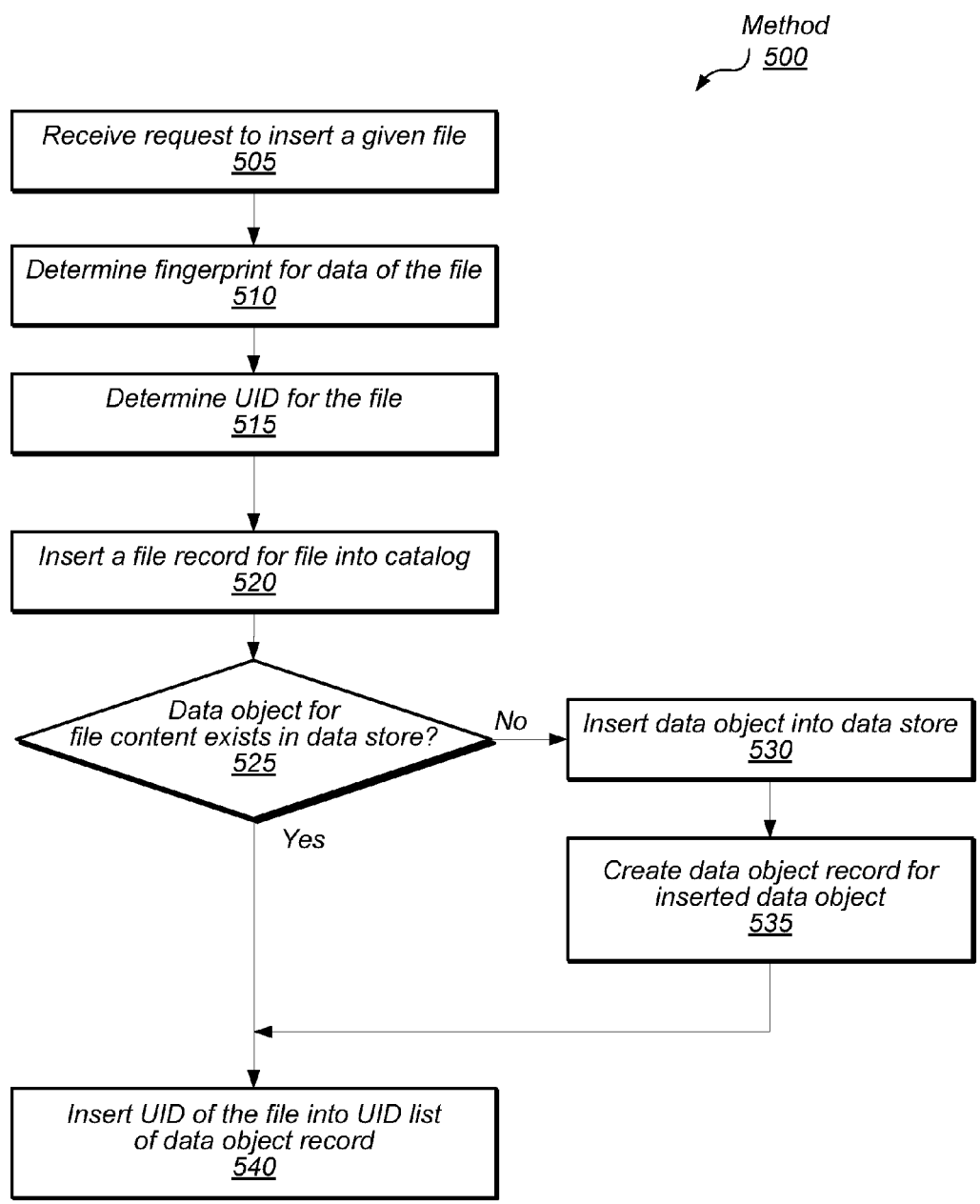
FIG. 5 is a flow diagram illustrating a method for inserting a file into a DSS configured to detect expired data objects, according to some embodiments.

FIG. 5 is a flow diagram illustrating a method for inserting a file into a DSS configured to detect expired data objects, according to some embodiments. Method 500 of FIG. 5 may be executed by a DSS, such as DSS 110 of FIG. 3.

According to the illustrated embodiment, insert method 500 begins when the DSS receives a request to insert a given file, as in 505. In response to receiving the insert request in 505, the DSS determines a fingerprint (e.g., 415) for the data of the file, as in 510. The DSS may calculate the fingerprint as described above, such as by applying an MD5 hashing function to the file data.

In 515, the DSS may determine a UID for the given file. The UID determined in 515 may include a unique portion and sub-identifier portion, such as shown in FIG. 4c. The DSS may use the fingerprint determined in 510, the UID determined in 515, one or more file attributes of the given, and/or other information to create a new file record for the file in the DSS metadata catalog (e.g., catalog 320), as in 520.

In 525, the DSS determines whether a data object for the file content already exists in the data store. In some embodiments, the DSS may determine whether a data object for the file content already exists by searching the data store for a data object whose fingerprint is the same as the fingerprint determined in 510. In some embodiments, the DSS may use the data object index (e.g., 330) to quickly locate the any data object record with the same fingerprint.

If no data object for the file content already exists, as indicated by the negative exit from 525, then the DSS may insert a data object (for the file content) into the data store (as in 530). As in 535, the DSS may also create a new data object record in the data object index for tracking information about the newly inserted data object. The data object record may be analogous data object record 332a of FIG. 4b.

If a data object for the file content already exists in the data store (e.g., affirmative exit from 525) or once such an object has been inserted (e.g., step 530), the DSS inserts the UID of the file into the UID list of the data object's record, as in 540. Thus, the data object record's UID list identifies each inserted file that relies on the data object. In some embodiments, the DSS will insert the UID into the UID list only if the UID list does not already contain the UID. If a data object record includes a non-empty UID list, then at least one inserted file relies on the data object, and the data object is therefore not expired. If the UID list is empty, then the data object may be expired and consequently deleted.

Figure 6:
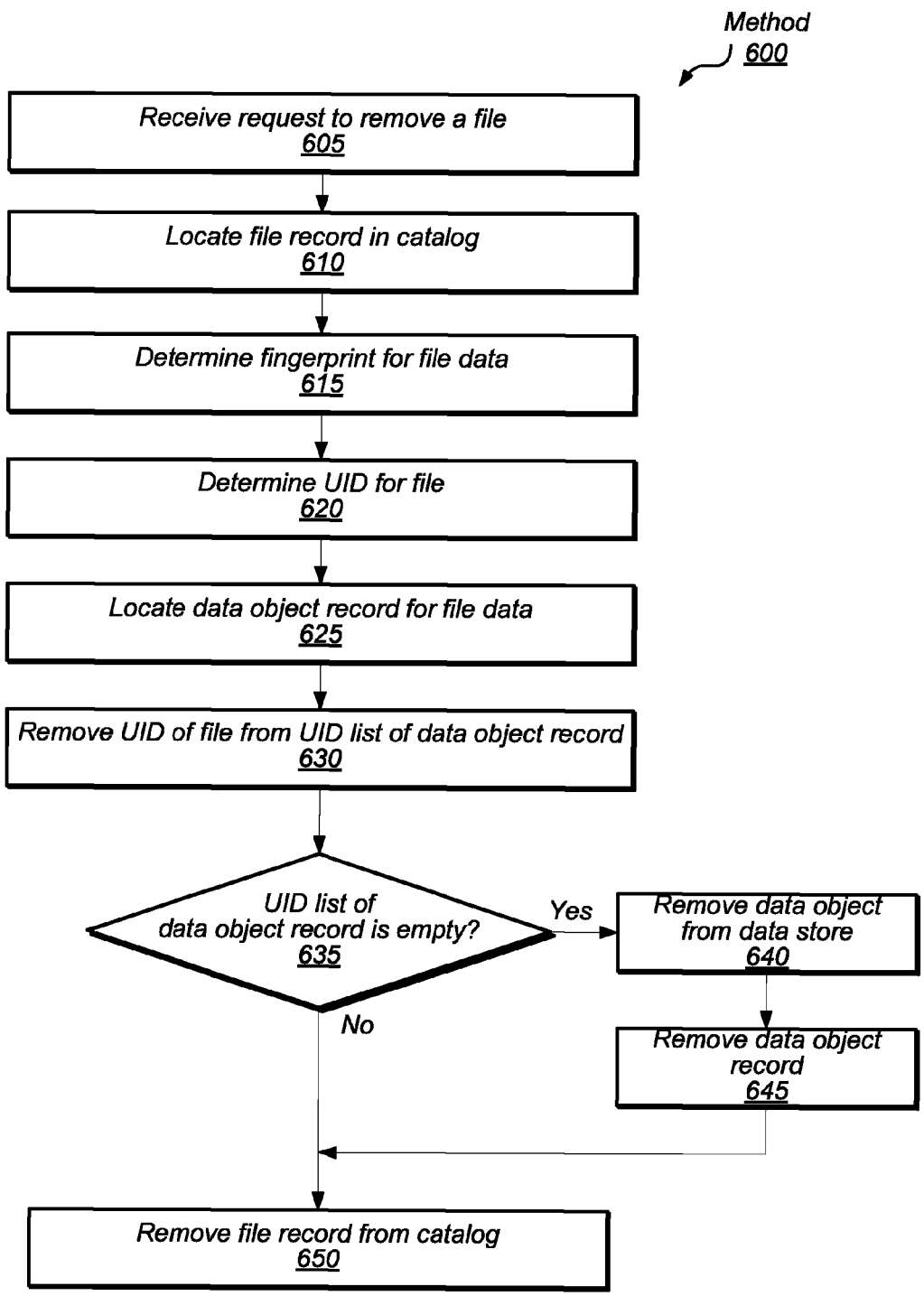
FIG. 6 is a flow diagram illustrating a method for removing a file from a DSS, according to some embodiments.

FIG. 6 is a flow diagram illustrating a method for removing a file from a DSS, according to some embodiments. The method of FIG. 5 may be performed by a DSS, such as DSS 110 of FIG. 3.

Method 600 begins when the DSS receives a request to remove a given file, as in 605. The request may be sent by a source computer that had previously inserted the file into the DSS. In response to receiving the request to remove the file in 605, the DSS locates the corresponding file record for that file in the catalog, as in 610. As in 615 and 620, the DSS may read the fingerprint and UID fields from the located file record.

In 625, the DSS may locate the data object record for the data object that stores the file's content. In some embodiments, the DSS may locate the appropriate data object record by searching a data object index (e.g., 330) using the content fingerprint determined in 615. The DSS may use the data object locator portion of the record (e.g., 430) to find the data object in the data store.

In response to the request for removal, the DSS may remove the UID of the identified file from the UID list of the data object record (if the UID exists in that UID list). By removing the UID from the list, the DSS may disassociate the file from the data object.

In 635, the DSS determines whether the UID list of the data object is empty. If so, as indicated by the affirmative exit from 635, then the data object holds data that is no longer relevant to any file in the DSS (i.e., the data object is expired). In some embodiments, if removing a file from the system causes a data object to become expired, the DSS may respond by removing the data object from the data store (as in 640) and removing the data object record from the data object index (as in 645). Lastly, the removal method 600 includes removing the file record itself from the catalog.

In some embodiments, the DSS may automatically remove expired data objects and their records as part of the removal process, as shown in FIG. 6. In other embodiments, removing the data object and record in 640 and 645 respectively may comprise simply marking the object and/or record for later removal. In such embodiments, a later sweep may detect data objects and/or records marked as expired and delete them. In some embodiments, the DSS may omit steps of 640 and 650 from the removal method and instead rely on a later sweep process to detect and delete expired data objects and records; such a sweep process may quickly detect expired data objects as those whose records include an empty UID list.

By inserting and removing data objects according to methods 500 and 600, the DSS may detect and delete expired data objects without need to resort to expensive mark-and-sweep techniques. In some embodiments, the information necessary to determine whether a given data object has expired is maintained in the data object index and is current during execution. Therefore, the DSS may determine that a given data object is expired as part of a remove operation or in a later sweep operation that need not be preceded by an expensive mark phase.

The method of associating data object records with UIDs of dependent files (i.e., UID list) is robust even when network communications are unreliable. Since the effects of insert and remove operations on a UID list are idempotent, the metadata remains reliable even when a source computer sends redundant insert or remove operations. For example, if a given source computer resends the same remove request (without an intervening insert), the second remove request may have no effect on the UID list, since the UID is already removed from the list. Likewise, resent insert requests do not result in multiple instances of the same UID appearing in the list. This integrity of metadata may free the DSS from having to perform frequent and expensive metadata recalibration operations (e.g., mark-and-sweep) that are common to systems with insert and remove operations that are not idempotent (e.g., counter-based systems that attempt to maintain a count of files relevant to each data object by incrementing/decrementing the counter on insert/remove respectively).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A non-transitory computer-readable storage medium storing program instructions that, when executed by a processor, cause the processor to carry out operations comprising:
   receiving a request to insert a file into a deduplicated storage system, wherein the file includes file content;
   in response to receiving the request:
      determining a unique identifier for the file;
      recording a first instance of the unique identifier in a catalog that identifies a location of a data object that includes the file content;
      determining whether the deduplicated storage system already stores the data object;
      in response to determining that the deduplicated storage system already stores the data object, recording a second instance of the unique identifier in a list of unique identifiers corresponding to the data object, wherein the list is separate from the catalog, wherein metadata of the data object is stored by the catalog, and wherein the unique identifier includes a sub-identifiers part comprising one or more sub-identifiers indicating the metadata, wherein the one or more sub-identifiers are usable to recover at least a portion of the metadata in response to the catalog becoming lost, corrupted, or otherwise unavailable;
   subsequent to recording the first instance and to recording the second instance, receiving a request to remove the file from the deduplicated storage system; and
   determining, based on the list, whether to grant the request to remove the file.

2. The non-transitory computer-readable storage medium of claim 1, wherein determining whether to grant the request to remove the file comprises:
   in response to the request to remove the file, removing the second instance of the unique identifier from the list; and
   after removing the second instance from the list, determining whether the list includes any remaining unique identifiers.

3. The non-transitory computer-readable storage medium of claim 2, wherein the program instructions, when executed by the processor, further cause the processor to carry out operations comprising:
   after removing the second instance from the list, in response to determining that the list does not include any remaining unique identifiers, granting the request to remove the file from the deduplicated storage system.

4. The non-transitory computer-readable storage medium of claim 2, wherein the program instructions, when executed by the processor, further cause the processor to carry out operations comprising:
   after removing the second instance from the list, in response to determining that the list includes at least one unique identifier, denying the request to remove the file from the deduplicated storage system.

5. The non-transitory computer-readable storage medium of claim 1, wherein the file corresponds to a segment of a larger file.

6. The non-transitory computer-readable storage medium of claim 1, wherein the unique identifier distinguishes the file from a plurality of files inserted into the deduplicated storage system from a plurality of source computers.

7. The non-transitory computer-readable storage medium of claim 1, wherein the unique identifier includes a sub-identifiers part comprising one or more sub-identifiers indicating provenance data for the file.

8. The non-transitory computer-readable storage medium of claim 7, wherein the program instructions, when executed by the processor, further cause the processor to carry out operations comprising filtering a plurality of unique identifiers including the unique identifier according to their respective sub-identifier parts.

9. The non-transitory computer-readable storage medium of claim 1, wherein the list includes respective unique identifiers corresponding to requests to insert, into the deduplicated storage system, files that contain the file content.

10. The non-transitory computer-readable storage medium of claim 1, wherein the correspondence between the list of unique identifiers and the data object is a fingerprint of the data object calculated by applying one or more hash functions to the file content.

11. A method comprising:
a computer system receiving a request to insert a file into a deduplicated storage system, wherein the file includes file content;
in response to receiving the request to insert the file, the computer system:
determining a unique identifier for the file;
storing a first instance of the unique identifier in a catalog that identifies a location of the file content and storing a second instance of the unique identifier in a list of unique identifiers corresponding to a data object stored in the deduplicated storage system, wherein the data object includes the file content, wherein the list includes at least one other unique identifier corresponding to the data object, and wherein the list is stored separately from the catalog; and
subsequent to storing the first instance and to storing the second instance, the computer system receiving a request to remove the file from the deduplicated storage system, wherein the list identifies whether the data object is referred to by at least one source computer;
wherein metadata of the file is stored by the catalog, and wherein the unique identifier includes a sub-identifiers part comprising one or more sub-identifiers indicating the metadata, wherein the one or more sub-identifiers are usable to recover at least a portion of the metadata in response to the catalog becoming lost, corrupted, or otherwise unavailable.

12. The method of claim 11, further comprising:
in response to the request to remove the file, the computer system removing the second instance of the unique identifier from the list;
in response to determining that the list does not include any remaining unique identifiers, the computer system determining that the data object is not referred to by at least one source computer; and
the computer system deleting the data object from the deduplicated storage system.

13. The method of claim 12, wherein the determining that the list does not include any remaining unique identifiers, the determining that the data object is not referred to by at least one source computer, and the deleting the data object are performed automatically in response to receiving the request to remove the file.

14. The method of claim 11, wherein the unique identifier includes a sub-identifiers part comprising one or more sub-identifiers indicating provenance data for the file.

15. The method of claim 14, further comprising the computer system filtering a plurality of unique identifiers according to their respective sub-identifier parts.

16. A system comprising:
a processor;
a memory coupled to the processor and storing program instructions that, when executed by the processor, cause the processor to carry out operations comprising:
receiving a request to insert a file into a deduplicated storage system, wherein the file includes file content;
in response to receiving the request to insert the file:
determining a unique identifier for the file, wherein the unique identifier includes a sub-identifier indicating metadata for the file;
recording a first instance of the unique identifier in a catalog that identifies a location of a data object that includes the file content, wherein at least a portion of the metadata is stored by the catalog;
in response to determining that the deduplicated storage system stores the data object, recording a second instance of the unique identifier in a list of unique identifiers corresponding to the data object;
subsequent to recording the first instance and to recording the second instance, receiving a request to remove the file from the deduplicated storage system; and
determining, based at least in part on the unique identifier being present in the list corresponding to the data object, that the data object is referred to by at least one source computer;
wherein metadata of the file is stored by the catalog, and wherein the unique identifier includes a sub-identifiers part comprising one or more sub-identifiers indicating the metadata, wherein the one or more sub-identifiers are usable to recover at least a portion of the metadata in response to the catalog becoming lost, corrupted, or otherwise unavailable.

17. The system of claim 16, wherein the program instructions, when executed by the processor, further cause the processor to carry out operations comprising:
subsequent to recording the first instance and to recording the second instance, receiving a second request to remove the file from the deduplicated storage system;
in response to the second request to remove the file, removing the second instance of the unique identifier from the list;
determining that the list does not include any remaining unique identifiers;
in response to determining that the list does not include any remaining unique identifiers, determining that the data object is expired; and
deleting the data object from the deduplicated storage system.

18. The system of claim 17, wherein the determining that the list does not include any remaining unique identifiers, the determining that the data object is expired, and the deleting the data object are performed automatically in response to receiving the second request to remove the file.

19. The system of claim 16, wherein the list includes respective unique identifiers of files inserted into the deduplicated storage system, wherein the files contain the file content.

* * * * *